(12) United States Patent
Hewitt et al.

(10) Patent No.: US 6,400,807 B1
(45) Date of Patent: Jun. 4, 2002

(54) SIMULATION OF TELEPHONE HANDSET

(75) Inventors: Dale Robinson Hewitt; Philip R L Taunton, both of Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/247,394

(22) Filed: Feb. 10, 1999

(30) Foreign Application Priority Data

Feb. 24, 1998 (GB) ............................................... 9803796

(51) Int. Cl.[7] ................................................ H04M 1/65
(52) U.S. Cl. ................... 379/88.11; 379/10.03
(58) Field of Search ............................ 379/1.02, 10.03, 379/29.02, 29.1, 67.1, 88.08, 88.11, 88.16, 88.18, 88.22, 90.01

(56) References Cited

U.S. PATENT DOCUMENTS

| | | | |
|---|---|---|---|
| 5,488,650 A | * 1/1996 | Greco et al. | 379/67 |
| 5,572,570 A | * 11/1996 | Kuenzig | 379/1 |
| 5,758,323 A | * 5/1998 | Case | 379/67 |
| 5,835,565 A | * 11/1998 | Smith et al. | 379/5 |
| 6,038,544 A | * 3/2000 | Machin et al. | 379/88 |
| 6,091,802 A | * 7/2000 | Smith et al. | 379/29 |
| 6,122,345 A | * 9/2000 | Johnson | 379/67.1 |

FOREIGN PATENT DOCUMENTS

GB 2286070 8/1995 ........... G06F/9/455

OTHER PUBLICATIONS

Computer Record 02095855 & Teleconnect, v15, n7, p114(4), Jul. 1997, Jainschigg J, "IVR app gens".
Computer Record 01912418 & Newsbytes, pNEW0315005, Mar. 15, 1996, "Telephony Software Upgrade Supports 72 PCs".

* cited by examiner

Primary Examiner—Scott L. Weaver
(74) Attorney, Agent, or Firm—Jerry W. Herndon

(57) ABSTRACT

A system for developing and testing a telephony application on a interactive voice system without using associated telephony hardware. The telephony application normally sends and receives hardware signals to and from the system telephony hardware for communication with a telephone. In this invention a telephony emulator intercepts the hardware signals from the voice application and sends back simulated hardware signals to the voice application. A graphical user interface provides the user output in response to the telephony emulator means and accepts and passes on user input to the emulator means.

18 Claims, 11 Drawing Sheets

```
T-REXX.EXE
OS/2      Ctrl+Esc  = Window List           Type HELP = he(
[F:\DTALK21]t-rexx menu.ctl
Please call LINE_02
Step 1  Waiting for call
Step 2  Call received
Step 2  Playing voice — Hello
Step 3  Playing voice — Menu
Step 4  Waiting for DTMF tone
Step 6  DTMF 1 received
Step 6  Playing voice — The time is ....
Step 3  Playing voice — Menu
Step 4  Waiting for DTMF tone
Step 9  DTMF 0 received
Step 9  Playing voice — Goodbye
        Please call LINE_02
Step 1  Waiting for call
```

FIG. 4

Step 2

Step 3

Step 4

Step 6

Step 9

Step 10

| Prompt Identifier | Associated Text | Voice Prompt |
|---|---|---|
| Hello | Hello | 〰️ |
| Welcome | Welcome to the menu demonstration application | 〰️ |
| Options | Press 1 for the time Press 2 ............ exit | 〰️ |
| Time | The current time is ............ | 〰️ |
| Goodbye | Goodbye. Thank you for using Menu | 〰️ |

FIG. 7

SIMULATION OF TELEPHONE HANDSET

FIELD OF INVENTION

This invention relates to a simulation of a telephone handset and in particular to a simulation tool for use as an aid to the development, testing and demonstration of interactive voice response (IVR) applications.

BACKGROUND OF INVENTION

End users typically interact with Interactive Voice Response (IVR) systems using a telephone handset across a telephone network. An IVR system running a telephony application is physically connected to a telephone switch (possibly public) using a Network Interface (NIF) adapter card or similar hardware. End user telephone handsets can be connected directly or indirectly (through a telephone network) to this switch. Voice Processing adapter cards are used to provide the applications with the capability to play (and record) voice and to recognize DTMF tones. Optionally, the IVR system can use Voice Recognition (VR) and Text-to-Speech (TTS) to provide the applications with the capability to recognize words spoken by an end user and to speak to an end user by synthesizing speech (from text).

Like other software applications, telephony applications require development, testing and demonstration before being made available to end users. During development, the telephony application must be programmed to present information to the end user (for example stored voice prompts) and accept instructions from the end user (for example recognize that they selected a particular number on the telephone number keypad). During testing and demonstration, the developer needs to verify that the telephony application presents information to and accepts instructions from the end user telephone handset in the desired way. Typically such testing and demonstration will take place at the development site on a fully functioning telephony voice application either on a stand alone telephony application development platform or at an established client's site where the necessary hardware is already installed. Although well established and in common use this practice is restricted such that developers normally have to work on a single development platform in the last stages of development leading to bottlenecks in the development process. Furthermore prospective clients may be inconvenienced by having to attend a site where such hardware exists.

A product that allows development, test and demonstration of telephony application without a telephony card installed in the PC is SimPhone from Parity Software. This product requires the use of a sound card and there is no facility for graphically viewing the voice prompts.

SUMMARY OF INVENTION

According to one aspect there is provided a system for developing a voice processing telephony application comprising a telephony emulator adapted to intercept signals from the application intended for telephony hardware and sending signals to the application thereby simulating signals from telephony hardware; and a user interface adapted to provide user output in response to the emulator and accept and pass on user input to the emulator.

According to a second aspect there is provided a method of testing a telephony application in a voice processing system comprising:

replacing the telephony hardware interface with an emulator interface adapted to intercept signals from the application intended for the telephony hardware and sending signals to the application thereby simulating signals from the telephony hardware; and providing a user interface adapted for user output in response to the emulator and for accepting user input and passing such input to the emulator.

By providing a software simulation of a telephone handset which can run on a Personal Computer (PC) without telephony hardware or an audio device, and which is capable of representing the input and output of a telephone handset, IVR application development, test and demonstration is simplified.

The costs (monetary, time and effort) associated with the installation, configuration and use of telephony adapter cards and a telephone switch could be, at the very least, postponed, and at the very most, never incurred.

Along with the rest of the software tools required to develop an IVR application, the software simulation of a telephone handset is able to run on a Notebook sized PC. The portability of a Notebook PC means that IVR application development, testing and demonstration is no longer constrained to a telephone connected office.

BRIEF DESCRIPTION OF DRAWINGS

In order to promote a fuller understanding of this and other aspects of the present invention, an embodiment will now be described, by way of example only, with reference to the accompanying drawings in which:

FIG. 4 is a screen dump of the steps in an operation of the present embodiment as shown in an operating system window;

FIG. 7 is an example database of the voice prompt information.

DETAILED DESCRIPTION OF PREFERRED EMBODIMENT

Figure 1:
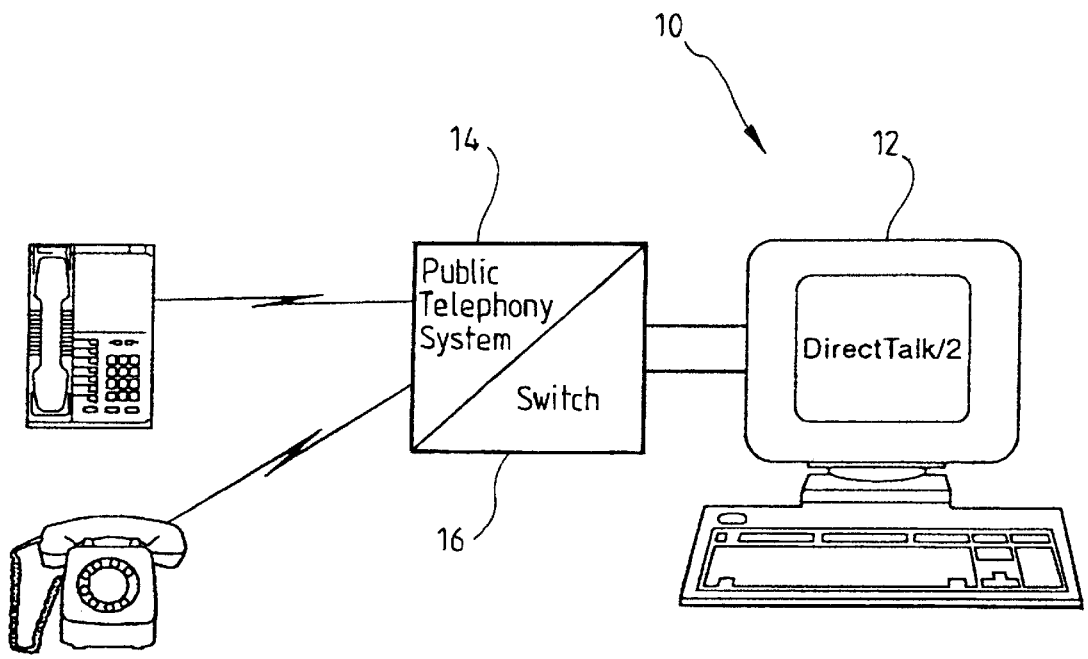
FIG. 1 is a typical interactive voice recognition (IVR) system connected to a switch and public telephony network.

An interactive voice recognition (IVR) system 10 for running voice application software is installed on a PC platform 12 and connected to a public telephony network 14 via IVR hardware (voice processing and communications hardware) and a telephony switch 16 (see FIG. 1). In this configuration the system can operate for its intended purpose, for example, receiving a call from a member of the public and playing a recorded message over the connection. When a caller dials the phone number of a voice application running on the IVR system 10 or when the application initiates the call, the IVR hardware and software work together to handle the call, direct the caller to specific services, and record and store messages. The IVR system 10 includes a GUI operating system such as IBM's OS/2 Warp and IVR software such as IBM's DirectTalk/2 product. For a fuller and more detailed explanation of IBM's DirectTalk/2 product refer to IBM manual DirectTalk/2 General Information and Planning, GB35-4403 and DirectTalk/2 Application Developer's Guide, SB35-4408.

Figure 2:
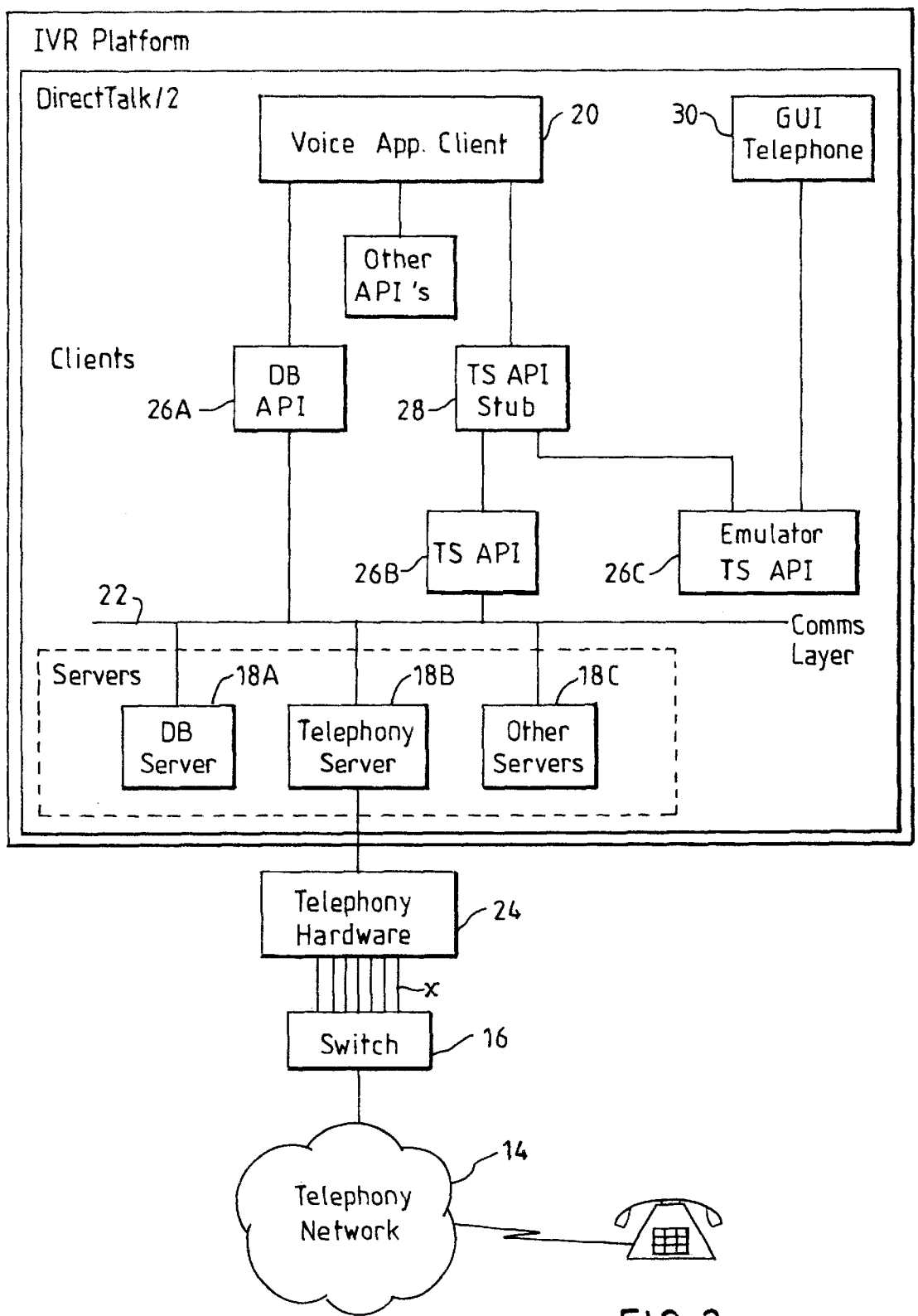
FIG. 2 is a schematic representation of the components of the IVR system including the simulation tool of the present invention.

The IVR software architecture is a system of servers 18A,B,C and client 20 connected to each other through paths managed by a General Server Interface (GSI) (Comms layer) 22 (see FIG. 2). Servers 18A, B, C are programs that provide services to the IVR. The server of interest in the present embodiment is the telephony server 18B but the IVR system includes others such as a database server 18A. The telephony server 18B provides a centralized interface to the voice processing hardware. This server 18B interfaces with the device drivers to supply voice processing services to the voice application and to other servers on request. Such services include, for example, handling inbound and outbound calls, playing a voice prompt over a telephone connection from voice prompt data and accepting tone input.

Programs that use these services are clients and an example of such is the voice application 20. The voice application contains a list of instructions to perform a telephony function, for instance, a user may wish to call the IVR system 10 and find out what the present time is. In this case the voice application will contain a set of instruction along the lines of : wait for incoming call on line x; once a call is received connect with call and play welcome message; play menu message; wait for tone input from user; on tone input 1 play the time and wait for further tone input; on tone input 0 play the goodbye message and exit. Each instruction is a request to the Telephony Server 18B to perform a service and its format is as simple as possible so that an application programmer can write applications without understanding the detailed working of the server and communication protocols.

In order to keep the requests as simple as possible, the client makes a server request through an Application Programming Interface (API) 26A,B dedicated to communicating with one particular server. The API does not need detailed information from the client. It receives the simplified request and adds the GSI protocol information (same for each server) and the server protocol information (same for each function) and sends it to the GSI for transfer. A database API 26A, telephony server API 26B and emulated telephony server (TS) API 26C are also shown in FIG. 2.

The comms layer 22 is used so that servers may exist on separate but connected platforms. When a client makes a request to a server it builds the request and sends it to the comms layer 22. The comms layer 22 transfers the request and data to the server, and builds the response on data supplied to it by the server. It then transfers the response back to the client and the client processes the response. The request and response processing is synchronous. The client waits until the response is returned before it continues processing.

A software switch 28 is connected to the client 20 and is further connected to the TS API 26B and an Emulated TS API 26C. The Emulated TS API 26C is further connected to a GUI telephone 30. The emulated TS API 26C and the GUI telephone 30 together comprise the software simulation of the telephone. The switch routes requests from and responses to the telephony application through the actual APT if telephony hardware 24 is connected to the TS 18B and through the emulated TS API 26C if no telephony hardware 24 is connected.

An alternative to the software switch is a complete substitution of the TS APT 26B with the emulator TS API 26C so that calls to routines in TS API 26B are made directly to the equivalent routines in the emulator 26C.

The emulated TS API 26C receives TS APT requests from the telephony application, processes them and sends responses back. The telephony application sends the requests and receives responses in the same way as it would if the TS API were handling the request. In this way the telephony applications can be tested without connecting the IVR system to the telephony hardware 24. The emulated TS API 26C does not need to add the comms layer information to the request because the request is not sent out across the comms layer. The TS protocol information is also not added to the request since the request is not sent to the TS 18B.

The graphical user interface (GUI) has a graphical number pad, a visual voice display, a status indicator, a 'Talk' button and a 'Hang up'. The graphical number pad represents buttons for all the digits and the '*' and '#' symbols. Each button is an object and is capable of selection by positioning the mouse cursor over the graphical representation of the object and clicking the mouse button. The button raises an event which is detected by the emulator. The emulator sends a signal to the application to indicate that a particular button has been pressed. This is the equivalent of a button being pressed on a telephone and a DTMF tone being sent over the telephone line to the telephony hardware. The telephony hardware signals the TS API which in turn signals the application.

The 'Talk' and 'Hang up' buttons function in a similar manner. The visual voice displays has as its output text characters inside a text box. The status indicator displays the status of the connection, for example, whether a connection is made—'Talking to Application' or whether there is no connection 'Talking to Nobody'.

A sound card (not shown) may be installed in the PC and linked to the emulator via software drivers. As is explained below the emulator can use the sound card to output voice prompts intended for the telephony hardware.

In an alternative mode, the GUI simulates a rotary phone instead of a DTMP phone for testing the application's ability to handle such signals. From the GUI perspective the rotary dial may be graphically represented in the shape of a dial but this is not necessary and the graphical number pad may be used. When a user selects a number the GUI signals the emulator with the number and the type of phone that is the rotary type for pulse dialing. The emulator then generates pulse signals for the telephony application. Other emulator modes are Analogue Display Service Interface (ADSI) telephone and TDD telephone. The particular emulator mode is selected by choosing from a menu on the GUI (tone, pulse, TDSI or TDD) and the emulator looks and behaves according to the mode selected.

In ADSI mode the emulator receives information from the application concerning the function keys and labels on the user interface. Using this information the emulator builds a GUI interface to represent the function key and the labels. The user, on selecting a graphical key, will send an appropriate signal back to the application. For instance, the ADSI application may send an instruction to the emulator to set up a 'call forward' function key. A regulator ADSI phone selects a function key for the 'call forward' function and displays the label 'call forward' next to it on a suitably positioned LCD. The emulator of the embodiment, however, instructs the GUI to display a graphical function key with the 'call forward' label attached. On selecting the 'call forward' key with a mouse the user can initiate a call function routine in the emulator.

In TDD mode, signals from the application are converted into letters for display on the GUI. Conversely keyboard input is used to generated signals for sending to the application, such keyboard input may also be displayed on the GUI.

Features of the GUI telephone 30 and the emulated TS 26C include the ability to i) make a telephone call to a telephony application;

ii) receive a telephone call from a telephony application;

iii) "Ring" when making or receiving a telephone call;

iv) use the PC audio device and loudspeakers (or headphones) to audibly present recorded voice segments "played" by a telephony application;

v) visually present the text equivalent of voice segments;

vi) display a graphical telephone numeric keypad and receive user input from the same;

vii) send DTMF tones to an telephony application;

viii) display a rotary telephone dial and receive input from the same;

ix) send dial pulses to a telephony application;

x) prompt the end user for spoken or other input; and xi) use the PC audio device and microphone to "send" words spoken to a telephony application.

Figure 5A:
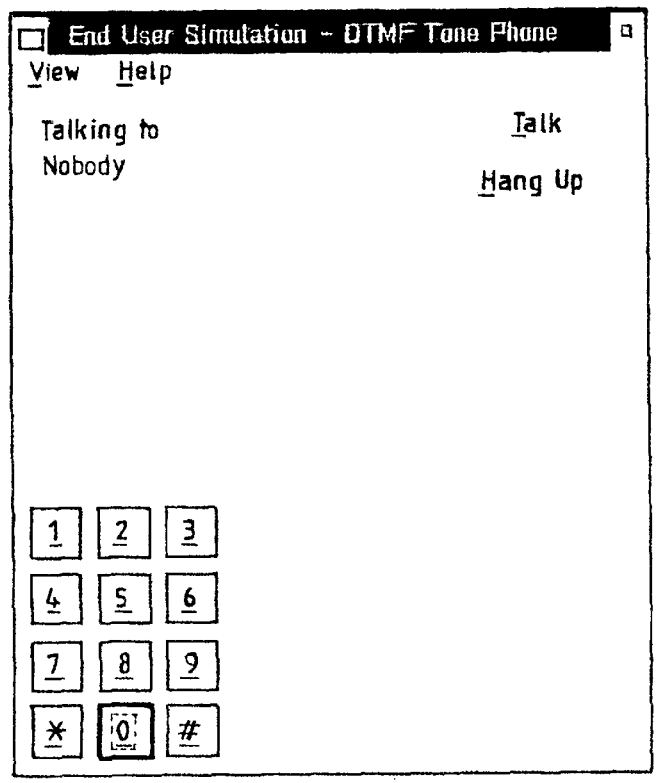
FIGS. 5A to 5J are screen representations of the simulation tool at various steps of the operation.
Figure 5B:
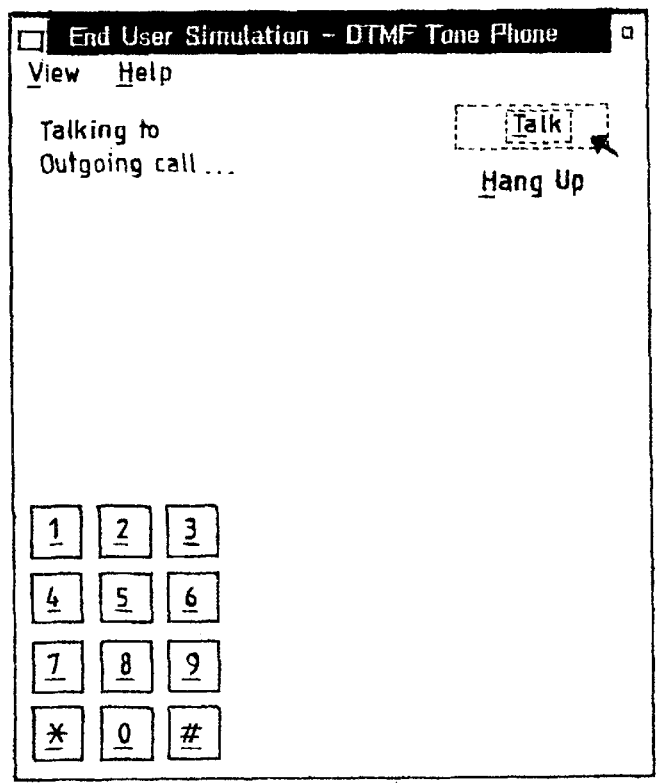
Figure 5C:
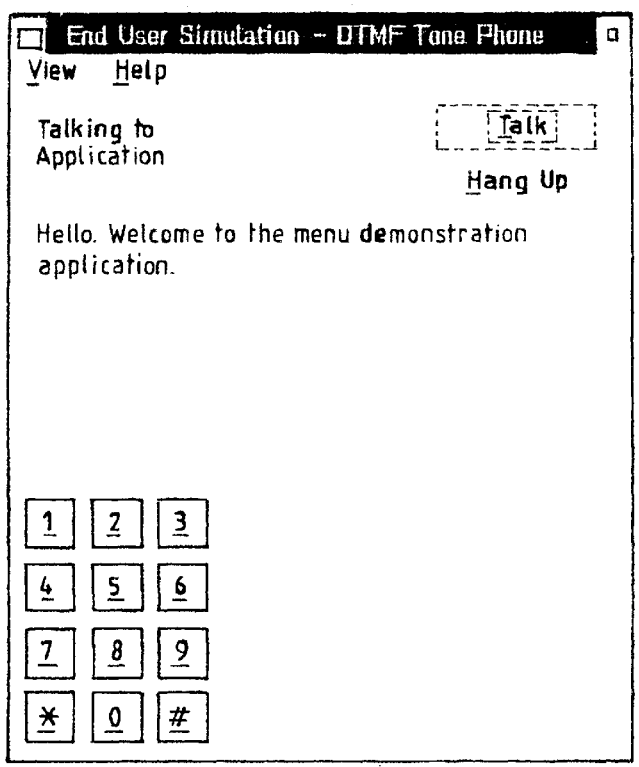
Figure 5D:
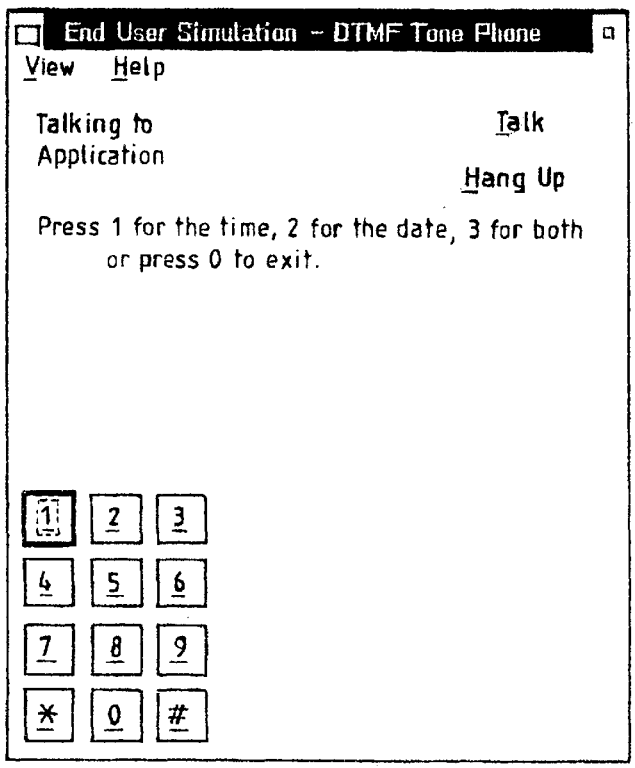
Figure 5E:
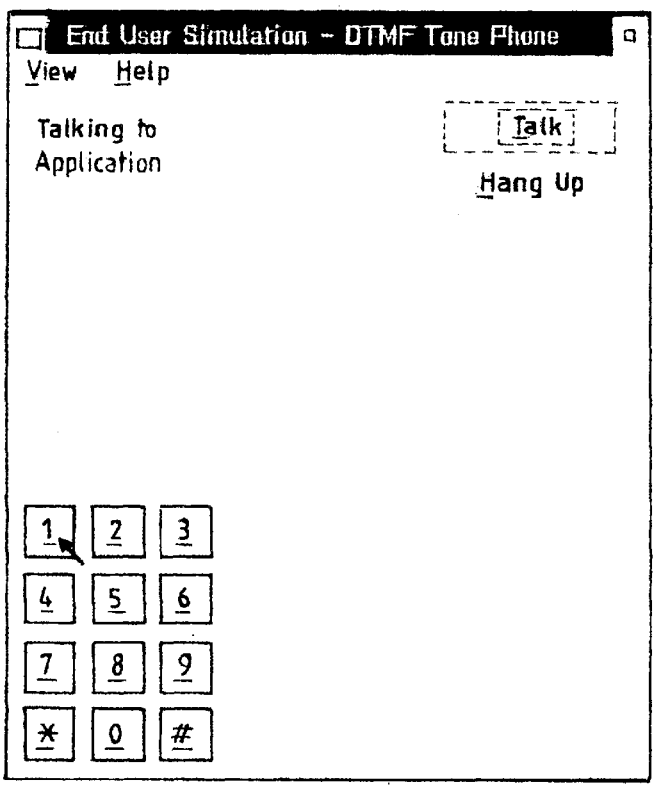
Figure 5F:
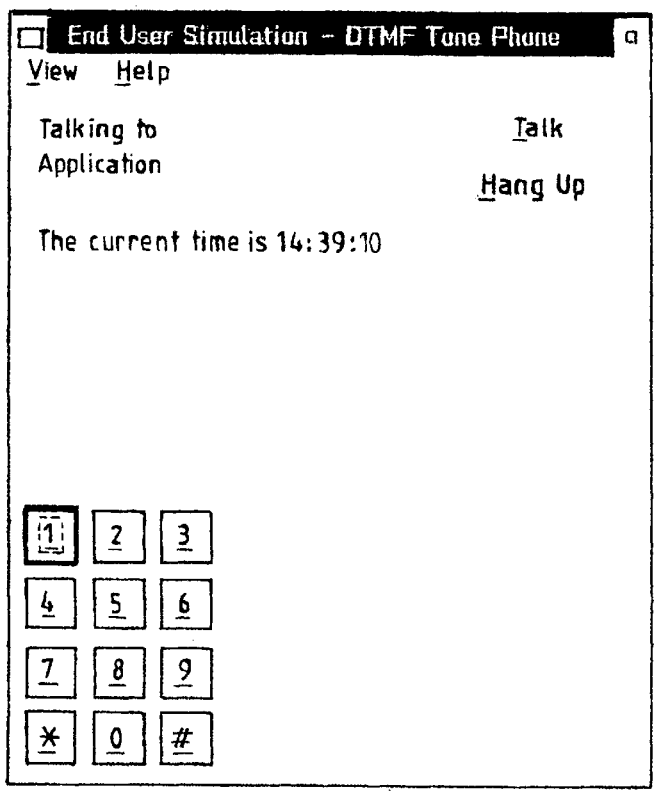
Figure 5G:
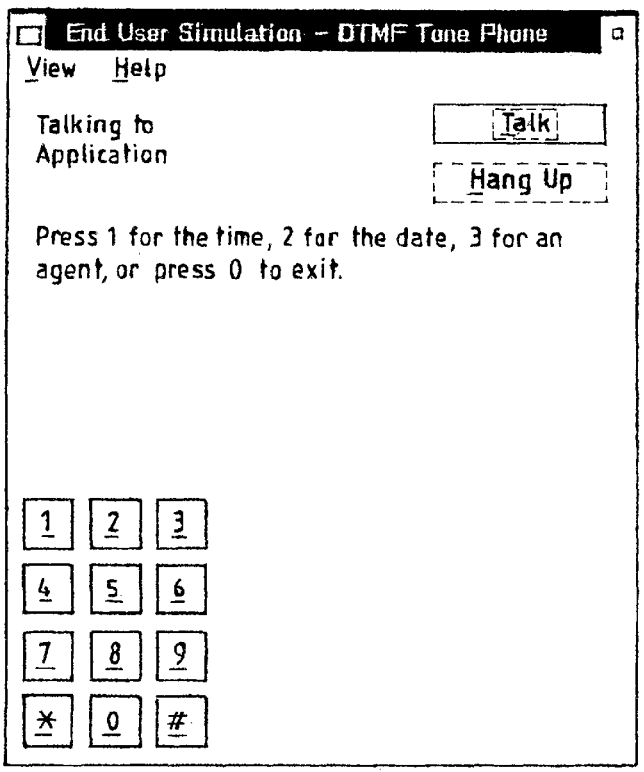
Figure 5H:
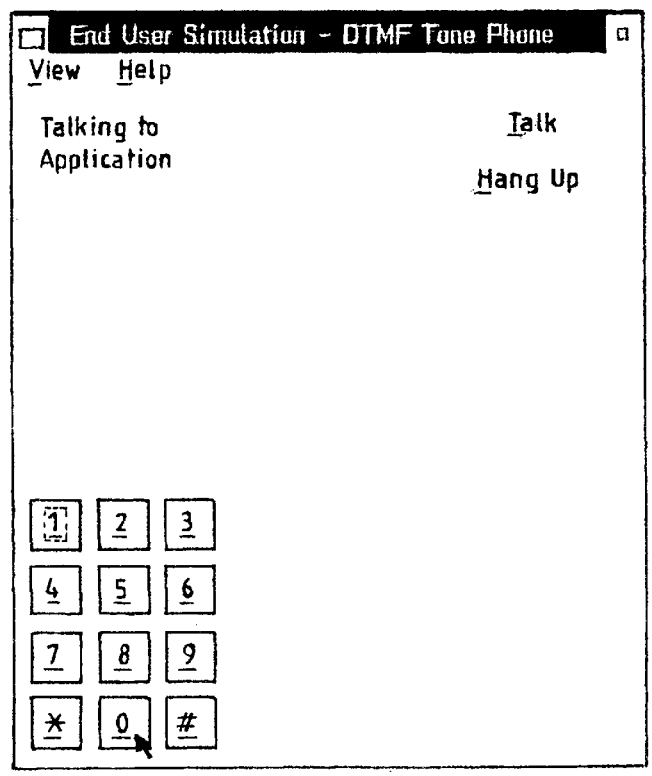
Figure 5I:
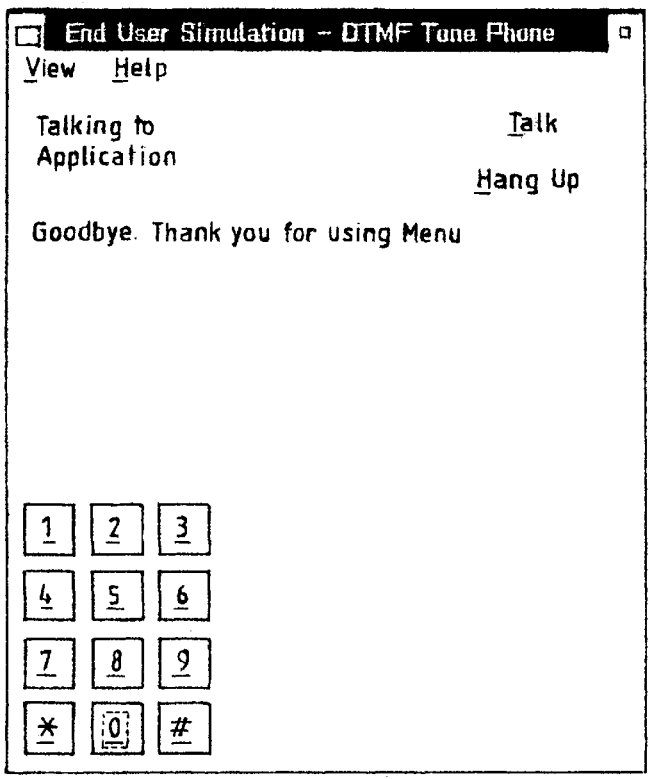
Figure 5J:
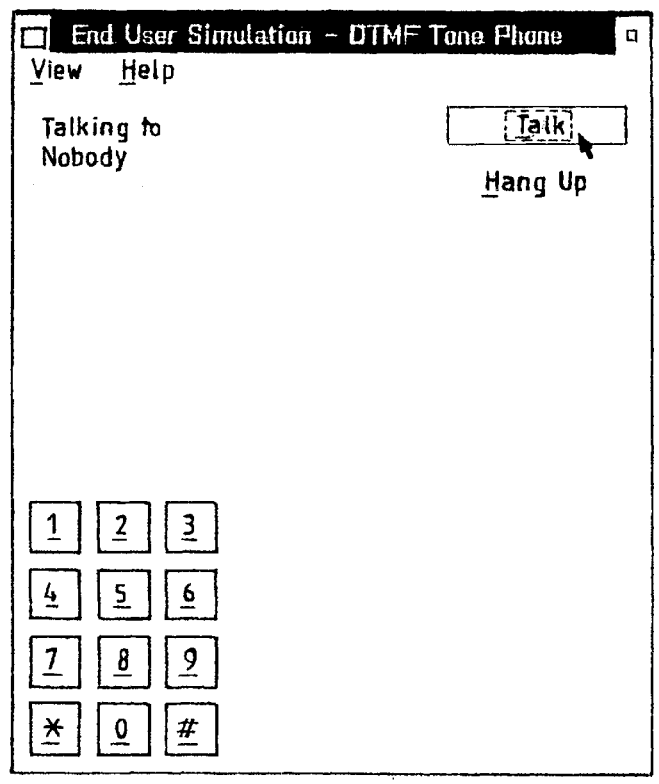
Figure 6:
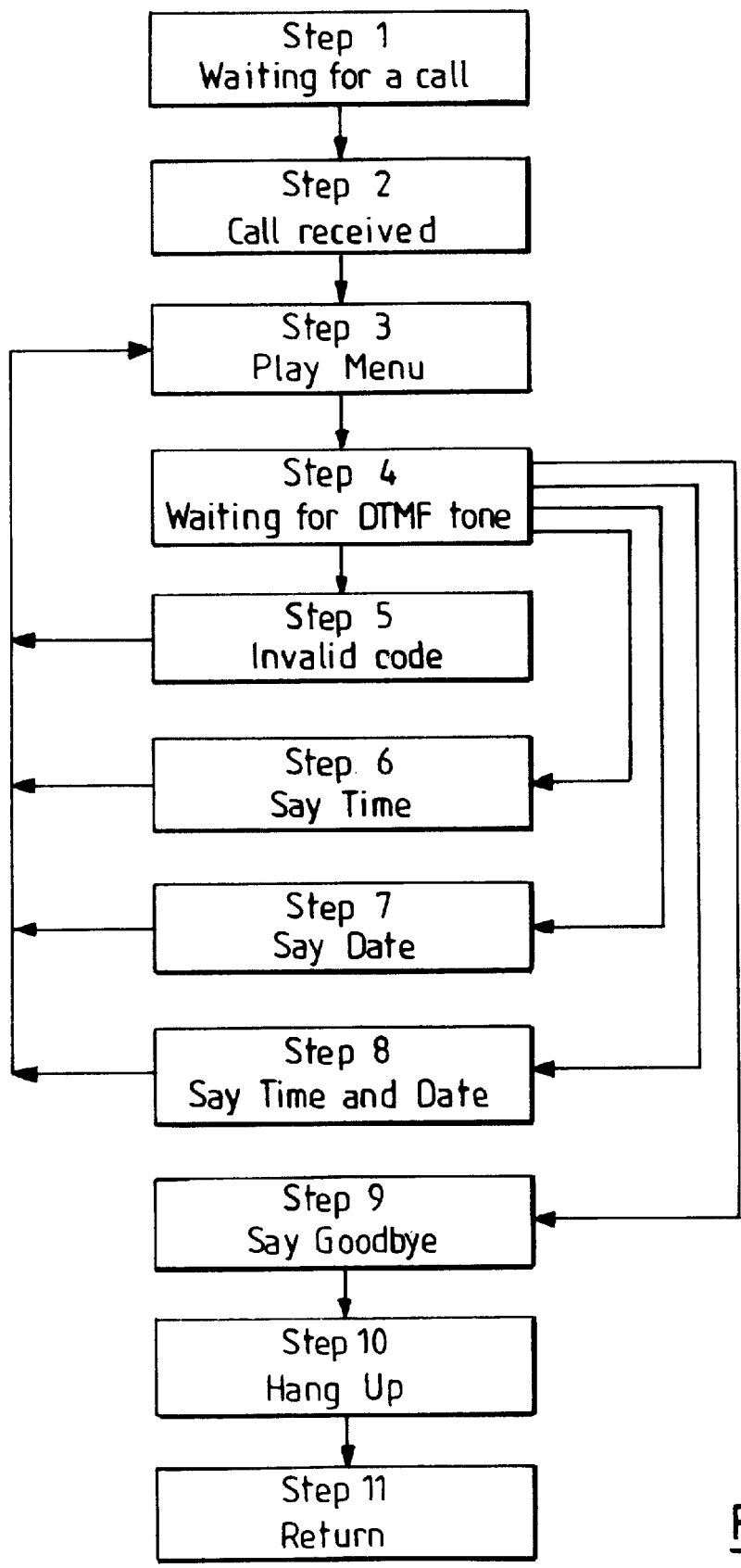
FIG. 6 is a representation of the possible steps of the operation.

To make a telephone call to a telephony application the caller selects the 'Talk' icon on the GUI (as in FIG. 5B). The GUI notifies the emulator that a call has been placed and the emulator sends to the application a TS API signal equivalent to the signal expected by the telephony application from the TS API 26B when a call was incoming on a telephone line to the telephony hardware.

To receive a telephone call from the telephony application the emulator intercepts an outgoing call signal from the telephony application and responds to the application as would the TS API 26B to indicate whether the outgoing call had been received. The emulator signals to the GUI that a call is incoming and the GUI displays an appropriate message, for example 'Incoming call—please select 'TALK' to answer'. When the user selects the 'TALK' icon the emulator signals to the application that the call has been answered.

To 'Ring' when making or receiving a telephone call the emulator can instruct the GUI to output a visual or audible indication. For instance placing a flashing 'RINGING' representation on the screen or calling appropriate routines controlling a sound card.

A sound card can also be used by the emulator to audibly present recorded voice prompts. When the application issues a play prompt signal for the telephony hardware, the emulator intercepts the play prompt signal for the telephony hardware and acquires a prompt identifier from the signal. The emulator then signals the sound card to play the voice prompt associated with the prompt identifier. If the sound card uses a different protocol from the telephony protocol then the prompt voice data is converted appropriately.

A particular advantage of the simulation tool is that it may still be used if the telephony system has no sound card and no telephony hardware. A play prompt signal is issued by the application and intercepted by the emulator and the prompt identifer is acquired. This prompt identifier is normally a pointer to the voice prompt data. The emulator then signals the GUI to visually display the prompt information, for example 'Hello', 'Option', 'Time'. If the telephony system does have a sound card then both forms of output may be used.

As an alternative to outputting the prompt identifer, text associated with the prompt identifier may be outputted by the GUI alternatively or in addition to the voice prompt through a sound card.

Voice prompts are normally one of the last stages of developing a telephony application which can cause problems if one is attempting to test the application before all the prompts are recorded. A solution is to have text data corresponding to the voice prompt also associated with the prompt identifier. When a play prompt signal is issued by the application the prompt identifer is acquired by the emulator and the associated text retrieved. The associated text is then sent to the GUI for visual display. In this way it is possible to test the application before the voice prompts have been recorded. FIG. 7 represents the prompt identifier, associated text and the voice prompt in table form. Clearly the data may be stored in a different form.

The emulator also intercepts text-to-speech signals from the voice application and acquires the text to be converted. It then instructs the GUI to display the text visually.

The emulator TS API 26C is similar to the actual TS API 26B in that the signals between the emulator and the voice application are similar to those between the TS APT 26B and the voice application. When the TS 18B receives a signal to play a voice prompt it would call a routine in the telephony driver but in the case of the emulator a 'play a voice prompt' signal causes the emulator to call a routine in the GUI telephone to print the text equivalent 32. If the user interface includes audio output then the emulator will call an audio driver routine to play the voice prompt (see FIG. 3).

Another example is that of DTMF signals. When the telephony hardware detects DTMF signals on the telephone line it generates the appropriate hardware signal which the TS API passes on to the voice application. In the case of the GUI interface the user may select a key on the keypad with the mouse and such an event causes the Emulator TS API to generate the same hardware signal 34 as would the TS API (see FIG. 3).

Figure 3:
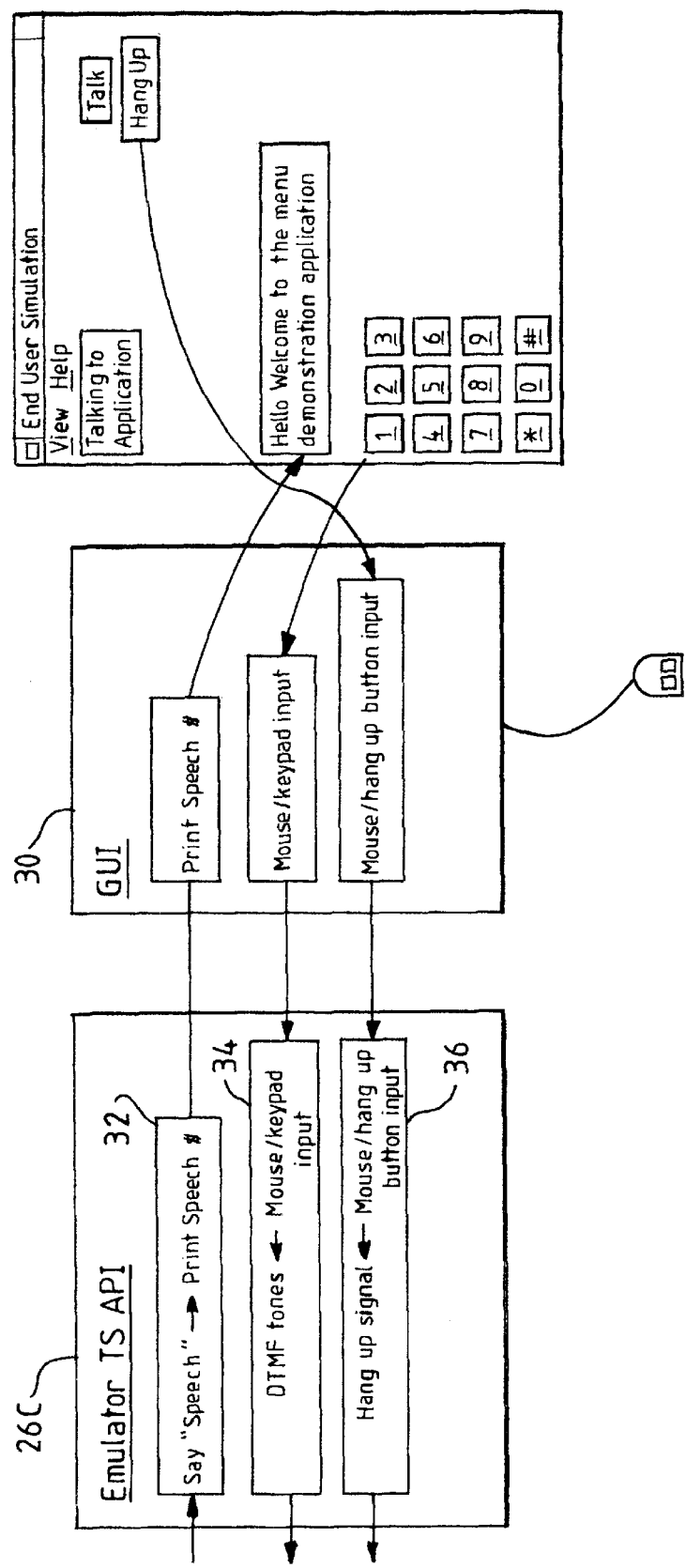
FIG. 3 is a schematic representation of an emulator and graphical user interface components of the present embodiment.

A further example shown in FIG. 3 is that of the hang up signal normally generated when a user quits the connection by replacing the handset. Such an event will trigger the TS API to generating a hang up signal. In the GUI the user selects the hang up button with the mouse and when the emulator TS API detects this event it generates the same hang up signal 36.

A pseudo program code example of a telephony application that may be tested using the embodiment of the invention is set out towards the end of this description and will help explain the operation of the embodiment. 'Say' commands send status messages to an operating system text window (see FIG. 4) so that the process flow may be followed by the developer. TREXX calls are hardware calls normally directed to the TS API 26B but which are intercepted by the switch 28 and passed on the emulator 26C which makes the software calls to the GUI (see FIG. 5).

Step 1 (see pseudo program code) in the operation waits for a call from the user. A 'Waiting for call' message is displayed in the operating system window (FIG. 4). The TS API 'Wait_for_Call' routine is called and a return code expected. In the event that the wait has expired (return code=1 and the processing returns to the start), the application is stopped (return code=2) or a call is placed (return code is another value and the processing passes on to the next step). In the embodiment the telephony hardware 24 may not be connected or functioning and the switch intercepts the TREXX signal and re-routes it to the emulator TS API 26C. The emulator 26C calls a routine in the GUI 30 to wait for a call from the user. When the user initiates a call on the GUI 30 the emulator 26C intercepts the call and produces the appropriate return code (FIG. 5A).

In Step 2 the user selects the 'Talk' button to make a call (FIG. 5B). 'Call received' and 'Playing voice—hello' are displayed on the operating system window (FIG. 4) and indicates an outgoing call. The telephony hardware 24 would receive the TREXX Play-module command indicating voice prompt file to be played over the connection, in this case the 'hello' voice prompt is 'Hello. Welcome to the menu demonstration application.' In the present case the switch 28 passes the command to the emulator 26C and a text equivalent of the voice prompt is displayed by the GUI 30 on the dialogue window (see FIG. 5C). If the telephone simulator has audio capacity then the voice prompt may be played directly. The emulator 26C returns a code back to the telephony application, if the user has hung up then this code is set to 14 and the application will proceed to step 10 and instruct the non-existent hardware to hang up. If the return code has another value then the application passes to step 3.

Step 3 displays 'Playing voice—menu' on the operating system window and sends the TREXX Play_module command 'choices'. This would normally initiate the telephony hardware 24 to play the voice prompt file 'choices' over the connection but in this case the switch 28 passes the command to the emulator 26C and a text equivalent of the voice prompt is displayed by the GUI 30 on the dialogue window (see FIG. 5D). Again audio drivers may be used to play the actual voice prompt. The emulator 26C returns a code to the application and if it is not the user hang up code then the telephone application passes on to step 4. In this embodiment the application gives the user 4 choices. If '1' is selected then the application outputs the time, if '2' is selected then the application outputs the date, if '3' is selected then the application outputs both the time and date and if '4' is selected then the application exits.

Step 4 displays 'Waiting for DTMF tone' on the operating system window (FIG. 4) and issues the TREXX Get_a_tone command which normally instructs the telephony hardware 24 to detect a DTMF tone over the connection and return a code back to the telephony application indicating the code. In the embodiment the switch 28 intercepts the command and sends it to the emulator 26C. The emulator 26C waits for the user to select a key on the GUI 30 using the mouse and returns a corresponding code to the telephony application. The application calls the appropriate routine depending on the code. For example, if return code 1 is received (as in FIG. 4) then step 6 is initiated, if return code 2 is received then step 6 is initiated, if return code 3 is received then step 8 is initiated and if return code 0 is received then step 9 is initiated. If no valid tone is received then the application moves on to step 5.

Step 5 issues the TREXX Play_module 'invalid' command when the user has not sent a valid DTMF tone. The emulator intercepts the command and displays an appropriate message.

Step 6 displays 'DTMF 1 received' and 'Playing voice—The time is . . . ' on the operating system window (FIG. 4) and issues the TREXX command Play_Module 'say_time' which would normally instruct the telephony hardware to speak the time. In this case the emulator 26C intercepts the command and displays the current time via the GUI (see FIG. 5). After completing Step 6 the application execution returns to Step 3 (FIG. 5G) and waits for a new key to be pressed.

Step 7 issues the TREXX command Play_Module 'say_date' which would normally instruct the telephony hardware to speak the date. In this case the emulator 26C intercepts the command and displays the current date on the GUI 30 (not shown in the Figures).

Step 8 issues the TREXX command to speak both the time and the date (not shown in the Figures).

The user selects '0' on the GUI telephone (FIG. 5H) and the emulator generates the appropriate signal for the application.

Step 9 displays 'DTMF 0 received', 'Playing voice—Goodbye' on the operating window (FIG. 4) and issues the TREXX command to speak the 'goodbye' voice prompt. In this case the emulator 26C intercepts the command and displays the text equivalent on the GUI 30 (see FIG. 5I).

Step 10 issues the TREXX command to hang up the line. The emulator intercepts such a command and cuts the communication between the GUI and the application.

Step 11 returns the application to the calling function when the application has stopped.

In FIG. 4 the operating system window shows one progression through the application the GUI simulation of which is shown in FIG. 5. Step 1—the application is waiting for a call which is duly received at step 2 and the appropriate greeting given (FIGS. 5A, 5B, 5C). Step 3 plays the menu for the user to choose from (FIG. 5D) and '1' is selected (FIG. 5E) and the current time displayed by step 6 (FIG. 5F). The menu is repeated by step 3 (FIG. 5G) and this time '0' is selected (FIG. 5H). Step 9 outputs the goodbye message (FIG. 5I) and step 10 hangs up the phone (FIG. 5J).

The pseudo code for the example telephony application is as follows:

```
/*******************************************************/
/* Step 1  Wait_for_Call    Wait        for callers              */
/* Step 2  Play_Module                  Say hello                */
/* Step 3  Play_Module                  Ask for choice           */
/* Step 4  Get_a_Tone                   Get choice               */
/* Step 5  Play_Module                  Say invalid choice       */
/* Step 6  Play_Module                  Say time only            */
/* Step 7  Play_Module                  Say date only            */
/* Step 8  Play_Module                  Say time and date        */
/* Step 9  Play_Module                  Say goodbye              */
/* Step 10           Hang_up_Phone      Hang up and start again  */
/* Step 11           RETURN             Stop if quiesced         */
/*******************************************************/
Step 1:
if TREXX_ENV = "COMMAND" then say "Please call
"telephone_number
say "Waiting for call"
    RC = TREXX(Wait_forCall,'1','3') /* Wait for
callers */
    Select
        When RC = 1        Then Signal Step 1 /* Wait
expired */
        When RC = 2        Then Signal Step 1 /*
Application stop */
        Otherwise
    End
Step 2:
say "Call received"
say "Playing voice - Hello"
    RC = TREXX(Play_Module, 'hello','no','0') /* Say
hello */
    Select
        When RC = 14 Then Signal Step 10 /* Caller hung
up */
        Otherwise
    End
Step 3:
say "Playing voice - Menu"
    RC = TREXX(Play_Module, 'choices', 'no', '0') /* As
for choice */
    Select
        When RC = 14 Then Signal Step 10 /* Caller hung
up */
        Otherwise
    End
```

-continued

```
Step 4:
say "Waiting for DTMF tone"
      RC = TREXX(Get_a_Tone) /* Get choice */
      Select
            When RC = 0 Then Signal Step 9 /* Key 0 pressed */
            When RC = 1 Then Signal Step 6 /* Key 1 pressed */
            When RC = 2 Then Signal Step 7 /* Key 2 pressed */
            When RC = 3 Then Signal Step 8 /* Key 3 pressed */
            When RC = 10 Then Signal Step 9 /* Key * pressed */
            When RC = 12 Then Signal Step 3 /* Time_out */
            When RC = 13 Then Signal Step 9 /* Last repeat */
            When RC = 14 Then Signal Step 10 /* Caller hung up */
            Otherwise
      End
Step 5:
      RC = TREXX (Play_Module, 'invalid','no','0') /* Say invalid choice */
      Select
            When RC = 0 Then Signal Step 3 /* Play complete */
            When RC = 1 Then Signal Step 3 /* Key detected */
            When RC = 14 Then Signal Step 10 /* Caller hung up */
            Otherwise
      End
Step 6:
      RC = TREXX(Play_Module, 'say_time', 'no','0') /* Say time only */
say "DTMF 1 received"
say "Playing voice - The time is . . . "
      Select
            When RC = 0 Then Signal Step 3 /* Play complete */
            When RC = 1 Then Signal Step 3 /* Key detected */
            When RC = 14 Then Signal Step 10 /* Caller hung up */
            Otherwise
      End
Step 7:
      RC = TREXX(Play_Module, 'say_date','no','0') /* Say date only */
      Select
            When RC = 0 Then Signal Step 3 /* Play complete */
            When RC = 1 Then Signal Step 3 /* Key detected */
            When RC = 14 Then signal Step 10 /* Caller hung up */
            Otherwise
      End
Step 8:
      RC = TREXX(Play_Module, 'both','no','0') /* Say time and date */
      Select
            When RC = 0 Then Signal Step 3 /* Play complete */
            When RC = 1 Then Signal Step 3 /* Key detected */
            When RC = 14 Then signal Step 10 /* Caller hung up */
            Otherwise
      End
Step 9:
      RC = TREXX(Play_Module, 'goodbye','no','0') /* Say goodbye */
say "DTMF 0 received"
say "Playing voice - Goodbye"
Step 10:
      RC = TREXX(Hang_up_Phone, 'no') /* Hang up and start again */
      Select
            When RC = 0 Then Signal Step 9 /* Phone Hung up */
            Otherwise
      End
Step 11:
      RETURN /* Stop if quiesced */
```

Although the embodiment has been described with reference to a PC based system running OS/2 Warp and DirectTalk/2 software it is not an essential requirement and alternative embodiments may use a different platform and IVR software. The embodiment is intended to function without the telephony server and hardware connected.

IBM, OS/2 Warp and DirectTalk/2 are all trademarks of International Business Machines Corporation in the US and/or elsewhere.

In summary there is described a system for developing and testing a telephony application on a interactive voice system without using the associated telephony hardware. The telephony application normally sends and receives hardware signals to and from the system telephony hardware for communication with a telephone. In this invention a telephony emulator receives the hardware signals from the voice application and sends back simulated hardware signals to the voice application. A graphical user interface provides the user output in response to the telephony emulator means and accepts and passes on user input to the emulator means.

Now that the invention has been described by way of a preferred embodiment, various modifications and improvements will occur to those person skilled in the art. Therefore it should be understood that the preferred embodiment has been provided as an example and not as a limitation.

What is claimed is:

1. A system for developing a voice processing telephony application comprising a telephony emulator adapted to intercept telephony output signals including a voice prompt signal from the application intended for telephony hardware and sending telephony input signals to the application thereby simulating signals from telephony hardware; and a user interface adapted to provide user output in response to the emulator and accept and pass on user input to the emulator, said interface comprising display means for displaying a visual representation of the voice prompt signal.

2. A system as claimed in claim 1 whereby the emulator comprises means for acquiring text data from a play voice prompt signal for visually displaying by the user interface.

3. A system as claimed in claim 2 whereby the text data is a prompt identifer code in the play voice prompt signal.

4. A system as claimed in claim 2 further comprising a database of text associated with each voice prompt and whereby the text data is set to equal the text associated with the voice prompt in the play voice prompt signal.

5. A system as claimed in claim 1 wherein the emulator comprises an application program interface based on the application program interface used for the telephony hardware.

6. A system as claimed in claim 5 wherein the emulator does not include a network communication interface.

7. A system as claimed in claim 5 wherein the emulator does not include a driver interface for telephony hardware.

8. A system as claimed in claim 5 wherein the emulator comprises an application program interface based on the application program interface used for a telephony line card for connection to telephony lines.

9. A system as claimed in claim 5 wherein the emulator comprises an application program interface based on the application program interface used for a voice card for connection to telephony lines.

10. A system as claimed in claim 1 wherein the user interface comprises means for providing output in a graphical representation and accepting input from the user from a keyboard or mouse.

11. A system as claimed in claim 1 wherein the user interface further comprises means for selecting a telephony mode and said emulator further comprises means simulating signals to and from a plurality of telephone protocols.

12. A system as claimed in claim 11 wherein the plurality of telephone protocols included tone, pulse, TDD and ADSI.

13. A system as claimed in claim 11 wherein the GUI displays a graphical key pad.

14. A system as claimed in claim 11 wherein the GUI displays a graphical rotary dial.

15. A method of testing a telephone application in a voice processing system comprising:

replacing the telephony hardware interface with an emulator interface adapted to intercept telephony output signals including a voice prompt signal from the application intended for the telephone hardware and sending signals to the application thereby simulating signals from the telephone hardware, and providing a user interface adapted for user output in response to the emulator and for accepting user input and passing such input to the emulator, and visually displaying a representation of a voice prompt.

16. A method as claimed in claim 15 further comprising acquiring text data associated with a play voice prompt signal for visually displaying as a representation of a voice prompt.

17. A method as claimed in claim 16 wherein the text data associated with a play voice prompt signal for visually displaying as a representation of a voice prompt.

18. A method as claimed in claim 16 wherein the text data is acquired from a database comprising a plurality of text strings, each associated with a particular voice prompt.

* * * * *